United States Patent
Nagoshi et al.

(10) Patent No.: US 7,335,434 B2
(45) Date of Patent: Feb. 26, 2008

(54) FUEL CELL SEPARATOR ASSEMBLY WITH DIFFUSION LAYER, MANUFACTURING METHOD THEREFOR, FUEL CELL UNIT, AND FUEL CELL STACK

(75) Inventors: Kentaro Nagoshi, Utsunomiya (JP); Keisuke Andou, Saitama (JP); Takeshi Matsubara, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 482 days.

(21) Appl. No.: 10/688,303

(22) Filed: Oct. 15, 2003

(65) Prior Publication Data

US 2004/0170880 A1   Sep. 2, 2004

(30) Foreign Application Priority Data

Oct. 17, 2002 (JP) .............................. 2002-303043
Oct. 17, 2002 (JP) .............................. 2002-303045

(51) Int. Cl.
 *H01M 2/02* (2006.01)
(52) U.S. Cl. .............................. 429/34; 429/38; 429/39
(58) Field of Classification Search ................ 429/34, 429/38, 39, 36, 26, 44; 156/272.8
See application file for complete search history.

(56) References Cited

U.S. PATENT DOCUMENTS 5,342,706 A * 8/1994 Marianowski et al. ........ 429/35
5,531,956 A * 7/1996 Ong et al. ..................... 419/2
2003/0003345 A1* 1/2003 Ohara et al. ................. 429/38

FOREIGN PATENT DOCUMENTS

| JP | 7-220743 | 8/1995 |
|---|---|---|
| JP | 08-255616 | 10/1996 |
| JP | 11-97039 | 4/1999 |
| JP | 2000-208153 | * 7/2000 |
| JP | 2002-151107 | 5/2002 |

OTHER PUBLICATIONS

Japanese Office Action for Application No. 2002-303045, dated Jul. 3, 2007.

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A separator assembly for a fuel cell stack includes a diffusion layer including a porous metal body for diffusing and supplying fuel or oxidizer to an electrode of the fuel cell stack, and a separator including a metal plate which is disposed adjacent to the diffusion layer, and which is provided for separating the fuel and the oxidizer from each other. The diffusion layer and the separator are welded together by laser welding. Flow passage partitions of the metal forming the diffusion layer, which are formed by melting the metal by irradiation by a laser beam and by solidifying the metal, may be formed in the diffusion layer so as to define a flow passage for the fuel or oxidizer in the diffusion layer.

6 Claims, 6 Drawing Sheets

FIG. 11

FUEL CELL SEPARATOR ASSEMBLY WITH DIFFUSION LAYER, MANUFACTURING METHOD THEREFOR, FUEL CELL UNIT, AND FUEL CELL STACK

BACKGROUND OF THE INVENTION

1. Field of the Invention

The present invention relates to a fuel cell separator assembly having a metal diffusion layer and a metal separator, relates a manufacturing method therefor, relates to a fuel cell unit including the separator assembly, and relates to a fuel cell stack including the fuel cell units.

Priority is claimed on Japanese Patent Application No. 2002-303043, filed Oct. 17, 2002, and Japanese Patent Application No. 2002-303045, filed Oct. 17, 2002, the contents of which are incorporated herein by reference.

2. Description of Related Art

In the field of fuel cells, a fuel cell unit is known which includes, for example, a solid polymer electrolyte membrane, an anode electrode and a cathode electrode that together sandwich the solid polymer electrolyte membrane, metal diffusion layers respectively disposed outside of the electrodes, and metal separators respectively disposed outside of the metal diffusion layers. In practice, such fuel cell units are stacked together to form a fuel cell stack.

In general, because a diffusion layer has low mechanical strength, it is difficult to handle the diffusion layer. Moreover, when fuel cell units are assembled, or when a fuel cell stack is assembled while handling the diffusion layers and the separators as independent elements, many elements must be handled, which may lead to poor assembling efficiency, and may lead to too many items being managed, which is troublesome.

In order to solve the above problems, a unified separator assembly has been developed in which a diffusion layer and a separator are connected and unified. For example, a diffusion layer and a separator may be unified using an adhesive or by using clips.

In the subsequent assembly process, a fuel cell stack may be formed by laser-welding an end of an anode side separator and an end of a cathode side separator which are disposed at two sides of a solid polymer electrolyte membrane (see, for example, Japanese Unexamined Patent Application, First Publication No. Hei 08-255616).

In a fuel cell stack including the above-mentioned conventional separators, the separators are configured by press-forming metal plates so that concave and convex portions are formed therein, and grooves which are formed between the separators and diffusion layers are used as fuel flow passages and oxidizer flow passages. Moreover, grooves which are formed between the fuel cell units adjacent to each other are used as coolant flow passages.

In the case in which the diffusion layers and the separators are unified using an adhesive, productivity is inferior because a number of manufacturing processes are required, including a coating process for an adhesive and a curing process for the adhesive, and because, in the curing process, the adhesive must be cured for a several hours at high temperature or at normal temperature.

On the other hand, in the case in which the diffusion layers and the separators are unified by holding them using clips, most of the resistance overvoltage during power generation is occupied by the contact resistance between the diffusion layers and the separators, and the contact pressure between the diffusion layers and the separators must be increased in order to reduce the resistance overvoltage. However, in order to increase the contact pressure, the fuel cell units and the fuel cell stack must have a relatively high rigidity, which leads to increase in size and weight of the fuel cell units and the fuel cell stack.

Furthermore, as in the case of conventional metal separators in which flow passage partitions are configured by press-forming, flow passages cannot be freely configured due to manufacturing limitations in the press-forming process.

In this case, the flow passages are formed on both sides of each of the separators in such a manner that the flow passage in one surface (the fuel flow passage or oxidizer flow passage) and the flow passage in the other surface (the coolant flow passage) are disposed in parallel with and adjacent to each other; therefore, an optimum flow passage for one fluid cannot be formed without being affected by another flow passage for another fluid.

Moreover, because the separators have the concave and convex portions, the thickness of each of the separators in the stacking direction is large, which leads to increase in thickness of the fuel cell units and the fuel cell stack in the stacking direction, i.e., leads to an increase in size of the fuel cell stack.

In addition, if the configuration of the flow passages must be changed, new press molds must be prepared for the new configuration of the flow passages; therefore, change of the configuration of the flow passages is not only difficult but is also expensive.

SUMMARY OF THE INVENTION

In view of the above circumstances, an object of the present invention is to provide a separator assembly with a diffusion layer which is compact and light weight, and which has excellent conductivity, and in which flow passages can be freely configured and easily changed. Another object of the present invention is to provide a method for fabricating the separator assembly with a diffusion layer. Further objects of the present invention are to provide a fuel cell unit and a fuel cell stack in which power generation can be efficiently performed.

In order to achieve the above objects, the present invention provides a separator assembly for a fuel cell stack, including: a diffusion layer including a porous metal body for diffusing and supplying fuel or oxidizer to an electrode of the fuel cell stack; a separator including a metal plate which is disposed adjacent to the diffusion layer, wherein the diffusion layer and the separator are welded together. In this separator assembly, the diffusion layer and the separator may preferably be welded together by laser welding. The separator may be provided for separating the fuel and the oxidizer from each other.

According to the separator assembly as configured above, because the diffusion layer and the separator are welded together, it is easy to handle the separator assembly. Moreover, because the diffusion layer and the separator are welded together by laser welding, the conductivity at connecting portions can be made very high; therefore, the electrical resistance between the diffusion layer and the separator can be made very low. Furthermore, because the electrical resistance between the diffusion layer and the separator can be made very low without applying high abutting pressure, the diffusion layer and the separator do not have to be made very rigid. An electron beam welding process or a TIG welding process may be used instead of the laser welding process.

In the above separator assembly, flow passage partitions of the metal forming the diffusion layer, which are formed by melting the metal by irradiation by a laser beam and by solidifying the metal, may be formed in the diffusion layer so as to define a flow passage for the fuel or oxidizer in the diffusion layer.

According to the separator assembly as configured above, because the diffusion layer and the separator are welded together, it is easy to handle the separator assembly.

Moreover, because a fuel flow passage or an oxidizer flow passage is formed in the diffusion layer using the flow passage partitions, concave and convex portions for forming the fuel flow passage or oxidizer flow passage do not have to be provided in the separator, i.e., the separator may be made flat. Accordingly, the thickness of the separator assembly with a diffusion layer in the stacking direction can be reduced. Furthermore, the flow passages for reaction gases can be configured more freely than in the conventional art. In addition, in contrast to fabricating conventional separators, a press-forming process is not required; therefore, the strength of the concave and convex portions in the separator do not have to be considered, the separator can be made thinner, and manufacturing cost can be reduced because molds for press-forming are not required.

Moreover, because the separator having a flat shape contacts the diffusion layer over the entire surface thereof, and the welded portions between the diffusion layer and the separator exhibit a very high conductivity, the electrical resistance between the diffusion layer and the separator can be made very low.

Furthermore, because the electrical resistance between the diffusion layer and the separator can be made very low without applying high abutting pressure, the diffusion layer and the separator do not have to be made very rigid.

In addition, because the diffusion layer and the separator have surface contact with each other over the entire surfaces thereof, increase in contact pressure at the contact areas between the diffusion layer and the separator can be limited even when a load in the stacking direction is applied to the separator assembly.

The separator assembly may further include a cooling layer including a porous metal body for allowing coolant to flow through, which is disposed adjacent to the separator and opposite the diffusion layer with respect to the separator. The cooling layer and the separator may be welded together by laser welding. Flow passage partitions of the metal forming the cooling layer, which are formed by melting the metal by irradiation by a laser beam and by solidifying the metal, may be formed in the cooling layer so as to define a flow passage for the coolant in the cooling layer.

According to the separator assembly as configured above, because the diffusion layer, the separator, and the cooling layer are welded together, it is easy to handle the separator assembly. Moreover, the flow passages for the coolant can be configured more freely than in the conventional art. In addition, because the cooling layer and the separator have surface contact with each other over the entire surfaces thereof, increase in contact pressure at the contact areas between the cooling layer and the separator can be limited even when a load in the stacking direction is applied to the separator assembly.

The present invention further provides a method for fabricating a separator assembly. The method includes the steps of: providing a diffusion layer including a porous metal body for diffusing and supplying fuel or oxidizer to an electrode of a fuel cell stack, and a separator including a metal plate; disposing the separator adjacent to the diffusion layer; and emitting a laser beam in the direction from the separator to the diffusion layer so as to laser-weld the diffusion layer with the separator.

According to the above method, the diffusion layer and the separator are welded together by laser-welding without exerting adverse effects on gas diffusion performance in the diffusion layer. Moreover, because the laser welding process is used, the time it takes to manufacture the separator assembly can be reduced, and the separator assemblies can be continuously manufactured.

The present invention further provides another method for fabricating a separator assembly. The method includes the steps of: providing a diffusion layer including a porous metal body for diffusing and supplying fuel or oxidizer to an electrode of a fuel cell stack, and a separator including a metal plate; disposing the separator adjacent to the diffusion layer; and emitting a laser beam in the direction from the diffusion layer to the separator so as to form flow passage partitions for defining a flow passage for the fuel or oxidizer in the diffusion layer.

According to the above method, welding between the diffusion layer and the separator, and forming the flow passage partitions in the diffusion layer can be performed simultaneously. Moreover, because the laser welding process is used, the time it takes to manufacture the separator assembly can be reduced, and the separator assemblies can be continuously manufactured.

The above method may further include the steps of: providing a cooling layer including a porous metal body for allowing coolant to flow through; disposing the cooling layer adjacent to the separator and opposite the diffusion layer with respect to the separator; and emitting a laser beam in the direction from the cooling layer to the separator so as to form flow passage partitions for defining a flow passage for the coolant in the cooling layer.

According to the above method, welding between the cooling layer and the separator, and forming the flow passage partitions in the cooling layer can be performed simultaneously. Moreover, because the laser welding process is used, the time it takes to manufacture the separator assembly can be reduced, and the separator assemblies can be continuously manufactured.

The present invention further provides a fuel cell unit including: a first electrode which is disposed in a first side of an electrolyte, and to which fuel is supplied; a second electrode which is disposed in a second side of the electrolyte, and to which oxidizer is supplied; diffusion layers including porous metal bodies which are respectively disposed adjacent to the first electrode and the second electrode, and which are provided for diffusing and supplying the fuel or the oxidizer to the first and second electrodes, respectively; and separators including metal plates which are respectively disposed adjacent to the diffusion layers, wherein the diffusion layer and the separator, which are disposed adjacent to each other, are welded together by laser-welding. The separators may be provided for separating the fuel and the oxidizer from each other.

According to the fuel cell unit as configured above, because the diffusion layer and the separator are welded together by laser welding, the conductivity at connecting portions can be made very high; therefore, the electrical resistance between the diffusion layer and the separator can be made very low. Furthermore, because the electrical resistance between the diffusion layer and the separator can be made very low without applying high abutting pressure, the fuel cell unit does not have to be made very rigid.

Moreover, because the laser welding process is used, the time it takes to manufacture the fuel cell unit can be reduced.

In the above fuel cell unit, flow passage partitions of the metal forming the diffusion layers, which are formed by melting the metal by irradiation by a laser beam and by solidifying the metal, may be formed in each of the diffusion layers so as to define a flow passage for the fuel or oxidizer in each of the diffusion layers.

According to the fuel cell unit as configured above, a fuel flow passage or an oxidizer flow passage is formed in the diffusion layer using the flow passage partitions, concave and convex portions for forming the fuel flow passage or oxidizer flow passage do not have to be provided in the separator, i.e., the separator may be made flat. Accordingly, the thickness of the separator assembly with a diffusion layer in the stacking direction can be reduced.

In addition, because the diffusion layer and the separator have surface contact with each other over the entire surfaces thereof, and the welded portions between the diffusion layer and the separator exhibit a very high conductivity, the electrical resistance between the diffusion layer and the separator can be made very low.

Furthermore, because the electrical resistance between the diffusion layer and the separator can be made very low without applying high abutting pressure, the fuel cell unit does not have to be made very rigid.

In addition, because the diffusion layer and the separator have surface contact with each other over the entire surfaces thereof, increase in contact pressure at the contact areas between the diffusion layer and the separator can be limited even when a load in the stacking direction is applied to the fuel cell unit.

Moreover, because the laser welding process is used, the time it takes to manufacture the fuel cell unit can be reduced, and the fuel cell units can be continuously manufactured.

The fuel cell unit may further include cooling layers including porous metal bodies for allowing coolant to flow through, which are respectively disposed adjacent to the separators and opposite the diffusion layers with respect to the separators. Each of the cooling layers and each of the separators may be welded together by laser welding. Flow passage partitions of the metal forming the cooling layer, which are formed by melting the metal by irradiation by a laser beam and by solidifying the metal, may be formed in each of the cooling layers so as to define a flow passage for the coolant in each of the cooling layers.

According to the fuel cell unit as configured above, because the flow passage for the coolant is defined by the flow passage partitions formed in each of the cooling layers, the structure of the fuel cell stack can be simplified.

In addition, because the cooling layer and the separator have surface contact with each other over the entire surfaces thereof, increase in contact pressure at the contact areas between the cooling layer and the separator can be limited even when a load in the stacking direction is applied to the fuel cell unit.

Moreover, because the laser welding process is used, the time it takes to manufacture the fuel cell unit can be reduced, and the fuel cell units can be continuously manufactured.

The present invention further provides a fuel cell stack including the above-mentioned fuel cell units, which are stacked with each other.

According to the above configuration, a fuel cell stack having high performance, which is compact and light, can be obtained.

DETAILED DESCRIPTION OF THE INVENTION

A fuel cell separator assembly with a diffusion layer of the present invention, a manufacturing method therefor, and first to third embodiments of a fuel cell unit and a fuel cell stack having the separator assemblies with diffusion layers will be explained below with reference to FIGS. 1 to 4.

Figure 1:
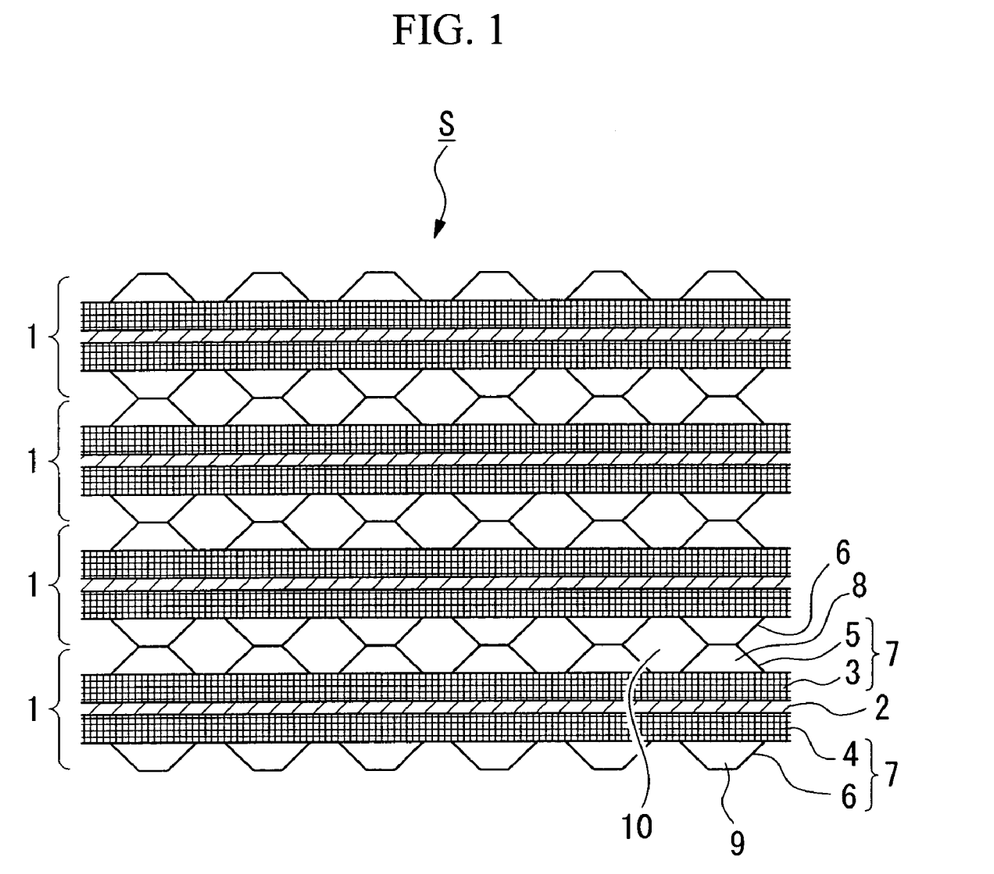
FIG. 1 is a cross-sectional view showing a fuel cell stack having separator assemblies with diffusion layers according to a first embodiment of the present invention.

FIG. 1 is a longitudinal cross-sectional view of a fuel cell stack S. The fuel cell stack S includes a number of fuel cell units 1 which are stacked with each other.

The fuel cell unit 1 includes a membrane electrode assembly 2 having a solid polymer electrolyte membrane and anode and cathode electrodes that together sandwich the solid polymer electrolyte membrane, an anode side diffusion layer 3 and a cathode side diffusion layer 4 respectively disposed outside of the membrane electrode assembly 2, an anode side separator 5 disposed outside of the anode diffusion layer 3, and a cathode side separator 6 disposed outside of the cathode diffusion layer 4.

The anode side diffusion layer 3 and the anode side separator 5 have been welded together by laser-welding to form a separator assembly 7 with a diffusion layer, and cathode side diffusion layer 4 and the cathode side separator 6 have been welded together by laser-welding to form another separator assembly 7 with a diffusion layer. The membrane electrode assembly 2 is sandwiched between the separator assemblies 7 and 7 to form the fuel cell unit 1.

Each of the anode side diffusion layer 3 and the cathode side diffusion layer 4 is including a porous metal body such as one made of stainless steel, HASTELLOY®, INCONEL®, Au, Cu, Ni, Al, or Ti. The anode side diffusion layer 3 diffuses a fuel gas that is supplied through a fuel flow passage 8, which will be explained later, and uniformly supplies the diffused fuel gas to the entire surface of the anode electrode of the membrane electrode assembly 2. The cathode side diffusion layer 4 diffuses an oxidizing gas that is supplied through an oxidizer flow passage, which will be explained later, and uniformly supplies the diffused oxidizing gas to the entire surface of the cathode electrode of the membrane electrode assembly 2.

The anode side separator 5 and the cathode side separator 6 are made of metal such as stainless steel, HASTELLOY®, INCONEL®, Au, Cu, Ni, Al, or Ti, and are formed by press-forming a metal plate so as to provide a corrugated cross section in which partially flat concave and convex portions are disposed alternately.

The outer surfaces of concave portions of the separators 5 and 6 respectively have surface contact with the corresponding diffusion layers 3 and 4, at which the separators 5 and 6 are laser-welded with the diffusion layers 3 and 4, respectively.

Between the anode side diffusion layer 3 and the anode side separator 5 in the anode side separator assembly 7, there are formed fuel flow passages 8, and between the cathode side diffusion layer 4 and the cathode side separator 6 in the cathode side separator assembly 7, there are formed oxidizing flow passages 9. The fuel (e.g., a hydrogen gas) supplied to the fuel flow passages 8 is supplied to the anode electrode of the membrane electrode assembly 2 through the anode side diffusion layer 3 while being diffused, and the oxidizer (e.g., air containing oxygen) supplied to the oxidizing flow passages 9 is supplied to the cathode electrode of the membrane electrode assembly 2 through the cathode side diffusion layer 4 while being diffused. Hydrogen ions produced at the anode electrode by catalytic reactions move to the cathode electrode through the solid polymer electrolyte membrane, and react with oxygen at the cathode electrode to generate electrical power.

Between the anode side separator 5 in one fuel cell unit 1 and the cathode side separator 6 in the adjacent fuel cell unit 1, there are formed coolant flow passages 10 for allowing coolant to flow through in order to cool down the fuel cell units 1.

Figure 2:
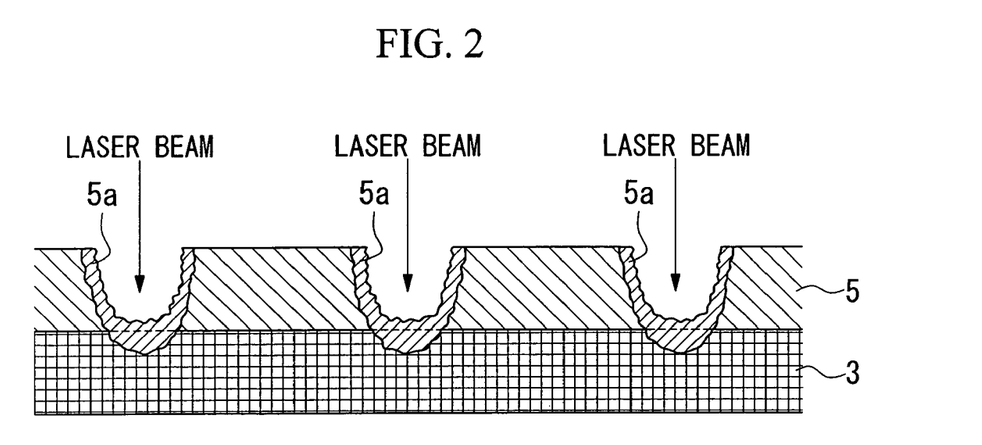
FIG. 2 is an enlarged cross-sectional view showing welded portions for illustrating a method for fabricating the separator assembly with a diffusion layer according to the first embodiment of the present invention.

Next, a process for welding the anode side diffusion layer 3 with the anode side separator 5 will be explained below with reference to FIG. 2 showing an enlarged cross section of welded portions.

First, the anode side diffusion layer 3, one surface of which is provided with a CT layer (not shown) for improving gas diffusion performance and conductivity and a CNV layer (not shown) as an adhesive, is prepared, and then the anode side separator 5 is placed on the other surface of the anode side diffusion layer 3, which is not provided with the CT layer and the CNV layer. Note that the CT layer includes carbon and PTFE (polytetrafluoroethylene), and the CNV layer includes carbon, ion exchange resin, and carbon fiber. A laser beam is emitted from a laser radiation device (not shown) disposed above the anode side separator 5 to the regions where the anode side diffusion layer 3 has surface contact with the anode side separator 5 in order to locally melt the anode side separator 5. The laser beam is preferably controlled so that just the anode side separator 5 is melted in order to maintain diffusion performance of the anode side diffusion layer.

Through this process, a portion of the melted metal Sa created by locally melting the anode side separator 5 penetrates into the anode side diffusion layer 3 made of a porous metal body. After penetration, the irradiation by the laser beam is terminated, and the anode side separator 5 is allowed to cool naturally so that the melted metal held in the anode side separator 5 and the melted metal penetrated into the anode side diffusion layer 3 are solidified. As a result, the anode side diffusion layer 3 and the anode side separator 5 are connected (i.e., spot-welded) to each other at some portions. The anode side diffusion layer 3 and the anode side separator 5 are unified by making a number of spot-welded portions in the regions where the anode side diffusion layer 3 has surface contact with the anode side separator 5. The spot-welding process is employed in this first embodiment in order to increase productivity; however, the present invention is not limited to this, and a seam welding process may be employed instead. By employing a seam welding process, the contact area between the anode side diffusion layer 3 and the anode side separator 5 can be increased.

The cathode side diffusion layer 4 is welded with the cathode side separator 6 in a similar manner.

The membrane electrode assembly 2 is sandwiched by the anode side separator assembly 7 and the cathode side separator assembly 7, which are formed through the above processes, and is unified therewith using a hot press process so as to yield the fuel cell unit 1.

Because the diffusion layer 3 and the separator 5 are welded together by laser-welding to form the anode side separator assembly 7, and the diffusion layer 4 and the separator 6 are welded together by laser-welding to form the cathode side separator assembly 7, it is easy to handle the separator assemblies 7 and 7, and it becomes easier to assemble the fuel cell unit 1 or to assemble the fuel cell stack S.

Moreover, because the diffusion layer 3 is connected to the separator 5, and the diffusion layer 4 is connected to the separator 6 by laser-welding, conductivity of connected portions is very high, and thus electrical resistance between the diffusion layer 3 and the separator 5, and electrical resistance between the diffusion layer 4 and the separator 6, can be reduced. As a result, performance of the fuel cell unit 1 and performance of the fuel cell stack S can be improved.

Furthermore, because electrical resistance can be reduced without applying abutting pressure, the separator assemblies 7 do not have to be very rigid; therefore, the separator assemblies 7 can be made compact and light. As a result, the fuel cell unit 1 and the fuel cell stack S do not have to be very rigid; therefore, the fuel cell unit 1 and the fuel cell stack S can also be made compact and light.

Moreover, because a laser welding process is employed, the time it takes to manufacture the separator assembly can be reduced, and the separator assemblies can be continuously manufactured. Due to ease of handling the separator assembly 7 as well, productivity in manufacturing the fuel cell units 1 and the fuel cell stacks S can be improved.

In addition, in this first embodiment, because the laser beam is emitted in the direction from the separator 5 or 6 to the diffusion layer 3 or 4 so that only the separator 5 or 6 is melted and the diffusion layer 3 or 4 is not melted, the diffusion performance of the diffusion layers 3 and 4 will not be degraded. Accordingly, a preferable diffusion performance of the diffusion layers 3 and 4 can be ensured.

A YAG laser is preferable for fabricating the separator assembly 7 of the present invention, specifically in view of precision welding. Other types of laser that can be used for fabricating the separator assembly 7 may be gas lasers such as a He—Ne laser, an Ar$^+$ laser, or $CO_2$ laser, solid state lasers such as a ruby laser or a glass laser, liquid lasers such as an organic laser or a dye laser, and semiconductor lasers such as a GaAs laser.

Instead of the laser welding process, an electron beam welding process or a TIG welding process can also be employed.

Figure 3:
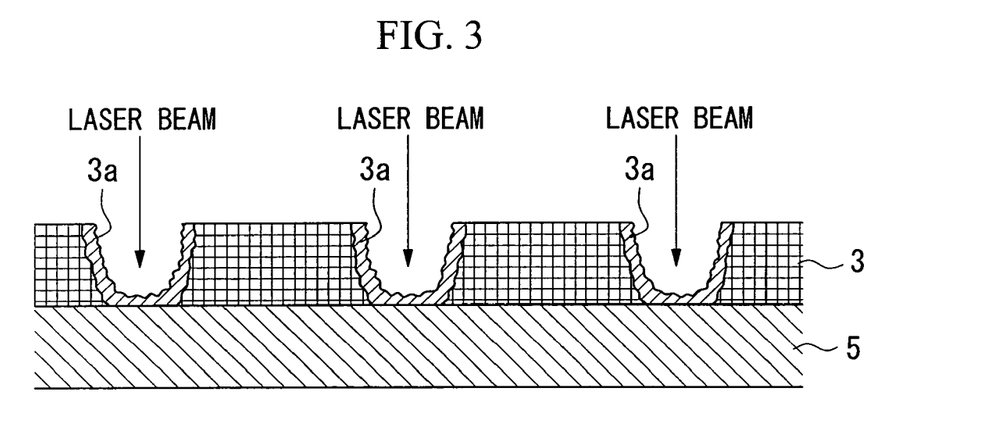
FIG. 3 is an enlarged cross-sectional view showing welded portions for illustrating a method for fabricating a separator assembly with a diffusion layer according to a second embodiment of the present invention.

In the above first embodiment, the laser beam is emitted in the direction from the separator to the diffusion layer when the diffusion layer is welded with the separator by laser welding; however, as a second embodiment, the laser beam may be emitted in the direction from the diffusion layer to the separator so as to locally melt the diffusion layer, and so as to weld the diffusion layer with the separator by the melted metal of the diffusion layer, as shown in FIG. 3. FIG. 3 is an enlarged cross-sectional view showing welded portions, in which the anode side diffusion layer 3 is welded with the anode side separator 5 using the melted metal 3a of the anode side diffusion layer 3.

Figure 4:
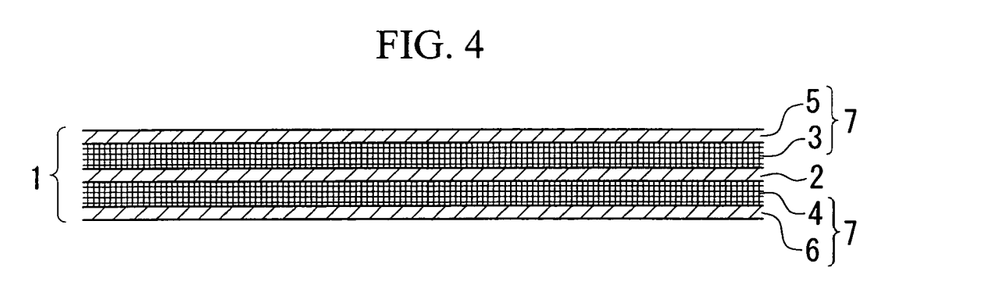
FIG. 4 is a cross-sectional view showing a fuel cell stack having separator assemblies with diffusion layers according to a third embodiment of the present invention.

In the above first embodiment, the separators 5 and 6, each having a corrugated cross section, are employed, and the grooves formed between the diffusion layer 3 and the separator 5 and between the diffusion layer 4 and the separator 6 are used as the fuel flow passages 8 and the oxidizer flow passages 9; however, flow passage partitions may be formed in the diffusion layers 3 and 4 so as to define fuel flow passages and oxidizer flow passages. In this case, as a third embodiment, the separators 5 and 6, each having a flat shape, can be used, as shown in FIG. 4.

Next, a fuel cell separator assembly with a diffusion layer of the present invention, a manufacturing method therefor, and fourth to ninth embodiments of a fuel cell unit and a fuel cell stack having the separator assemblies with diffusion layers will be explained below with reference to FIGS. 5 to 11.

Figure 5:
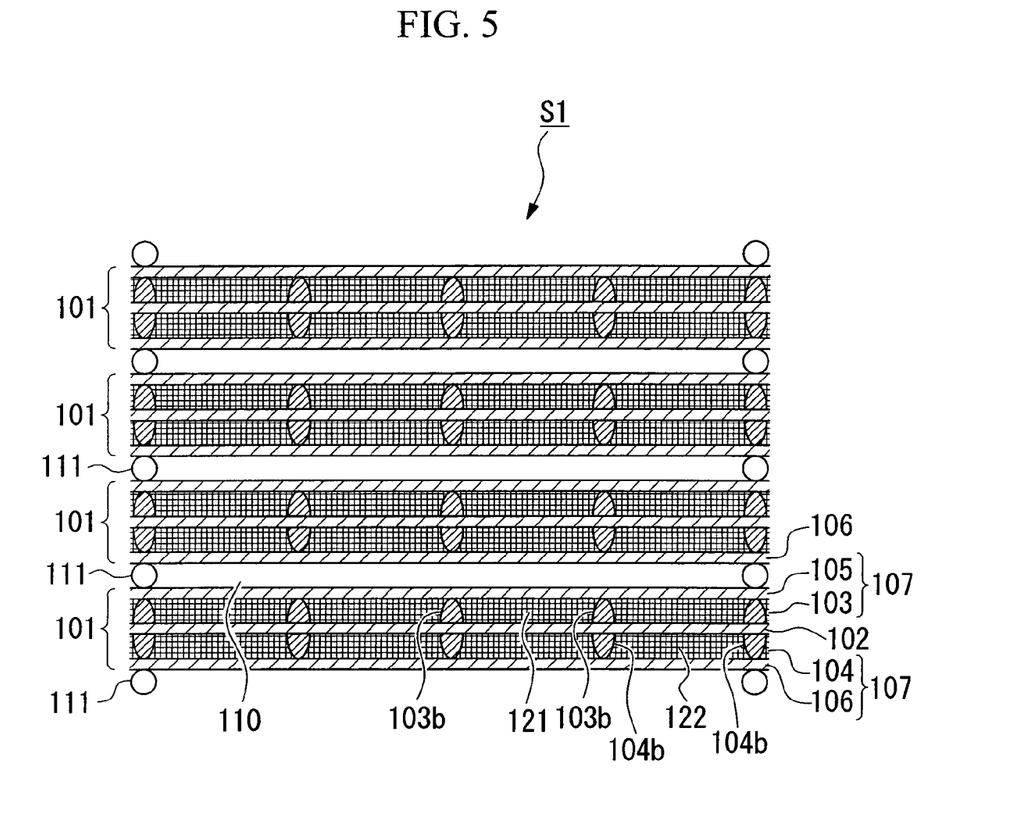
FIG. 5 is a cross-sectional view showing a fuel cell stack having separator assemblies with diffusion layers according to a fourth embodiment of the present invention.

FIG. 5 is a longitudinal cross-sectional view of a fuel cell stack S1 according to a fourth embodiment of the present invention. The fuel cell stack S1 includes a number of fuel cell units 101 which are stacked with each other.

The fuel cell unit 101 includes a membrane electrode assembly 102 having a solid polymer electrolyte membrane and anode and cathode electrodes that together sandwich the solid polymer electrolyte membrane, an anode side diffusion layer 103 and a cathode side diffusion layer 104 respectively disposed outside of the membrane electrode assembly 102, an anode side separator 105 disposed outside of the anode diffusion layer 103, and a cathode side separator 106 disposed outside of the cathode diffusion layer 104.

The anode side diffusion layer 103 and the anode side separator 105 have been welded together by laser-welding to form a separator assembly 107 with a diffusion layer, and cathode side diffusion layer 104 and the cathode side separator 106 have been welded together by laser-welding to form another separator assembly 107 with a diffusion layer. The membrane electrode assembly 102 is sandwiched between the separator assemblies 107 and 107 to form the fuel cell unit 101.

Each of the anode side diffusion layer 103 and the cathode side diffusion layer 104 is made of a porous metal body such as one made of stainless steel, HASTELLOY®, INCONEL®, Au, Cu, Ni, Al, or Ti. In the anode side diffusion layer 103, there are formed fuel flow passages 121 which are defined by flow passage partitions 103b. In the cathode side diffusion layer 104, there are formed oxidizer flow passages 122 which are defined by flow passage partitions 104b. The thickness of the diffusion layers 103 and 104 is set in a range from 50 to 300 μm.

The fuel (e.g., a hydrogen gas) supplied to the fuel flow passages 121 is diffused while flowing through the fuel flow passages 121, and is uniformly supplied to the entire surface of the anode electrode of the membrane electrode assembly 102. The oxidizer (e.g., air containing oxygen) supplied to the oxidizing flow passages 122 is diffused while flowing through the oxidizing flow passages 122, and is uniformly supplied to the entire surface of the cathode electrode of the membrane electrode assembly 102. Hydrogen ions produced at the anode electrode by catalytic reactions move to the cathode electrode through the solid polymer electrolyte membrane, and react with oxygen at the cathode electrode to generate electrical power.

The anode side separator 105 and the cathode side separator 106 are made of flat metal plates having thicknesses of from 50 to 200 μm, and may be made of stainless steel, HASTELLOY®, INCONEL®, Au, Cu, Ni, Al, or Ti. The separator 105 has surface contact with the corresponding diffusion layer 103 and is laser-welded therewith. The separator 106 has surface contact with the corresponding diffusion layer 104 and is laser-welded therewith.

Between the anode side separator 105 in one fuel cell unit 101 and the cathode side separator 106 in the adjacent fuel cell unit 101, there are formed coolant flow passages 110, which are sealed and defined by sealing members 111, for allowing coolant to flow through in order to cool down the fuel cell units 101.

Figure 6:
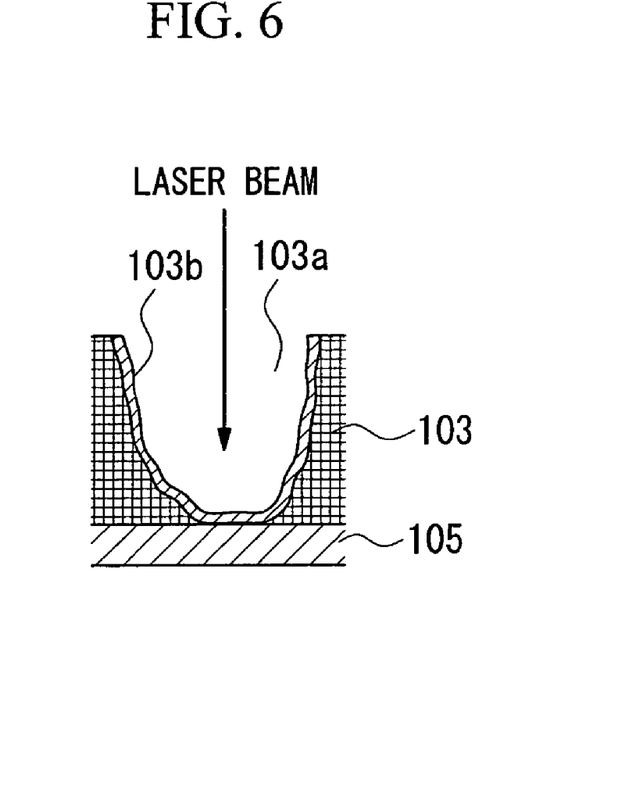
FIG. 6 is an enlarged cross-sectional view showing a welded portion for illustrating a method for fabricating a separator assembly with a diffusion layer according to the fourth embodiment of the present invention.

Next, a process for welding the anode side diffusion layer 103 with the anode side separator 105, and a process for forming the flow passage partitions 103b will be explained below with reference to FIG. 6 showing an enlarged cross section of a welded portion.

The anode side diffusion layer 103 is placed on the anode side separator 105, and a laser beam is emitted from a laser radiation device (not shown) disposed above the anode side diffusion layer 103 to the anode side diffusion layer 103 in order to locally melt the anode side diffusion layer 103. The laser beam is preferably controlled so that a portion of the anode side diffusion layer 103 is melted to the bottom thereof where the anode side diffusion layer 103 has surface contact with the anode side separator 105.

Then, the irradiation by the laser beam is terminated, and the anode side diffusion layer 103 is allowed to cool naturally so that the anode side diffusion layer 103 is connected to the anode side separator 105 by the metal solidified at the bottom of the anode side diffusion layer 103, and thus the anode side diffusion layer 103 and the anode side separator 105 are welded together. At the same time, the melted metal adjacent to a groove 103a is solidified, and thereby the pores disposed around the groove 103a are closed, and a flow passage partition 103b is formed. Because the flow passage partition 103b continues to the welded portion between the anode side diffusion layer 103 and the anode side separator 105, the flow passage partition 103b acts to separate two regions, i.e., flowing of gas between the two regions is inhibited.

Figure 7:
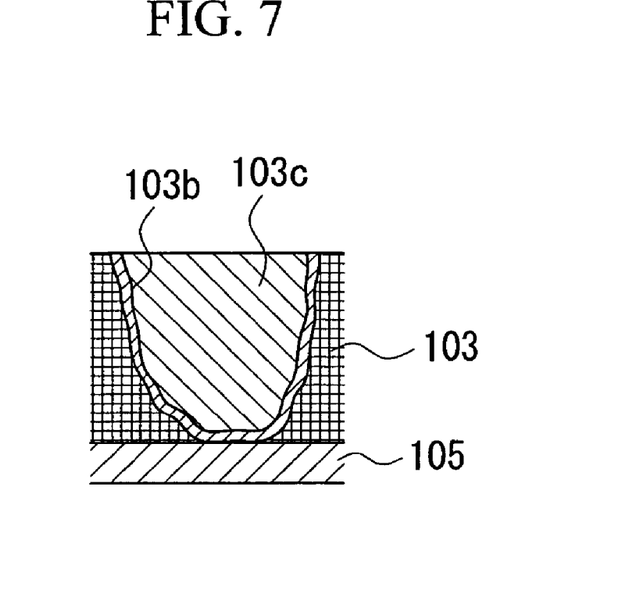
FIG. 7 is an enlarged cross-sectional view showing a welded portion for illustrating a method for fabricating a separator assembly with a diffusion layer according to a fifth embodiment of the present invention.

As a fifth embodiment, after laser welding and forming of the flow passage partition 103b, or simultaneously with laser welding and forming of the flow passage partition 103b, the groove 103a may be filled with a padding 103c by making a melted metal flow into the groove 103a, as shown in FIG. 7.

Figure 8:
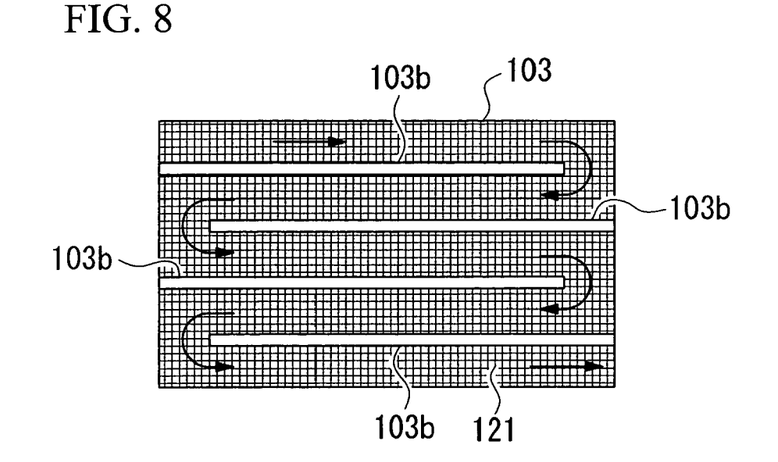
FIG. 8 is a plan view showing a pattern of reaction gas flow passages formed in a separator assembly with a diffusion layer according to a sixth embodiment of the present invention.
Figure 9:
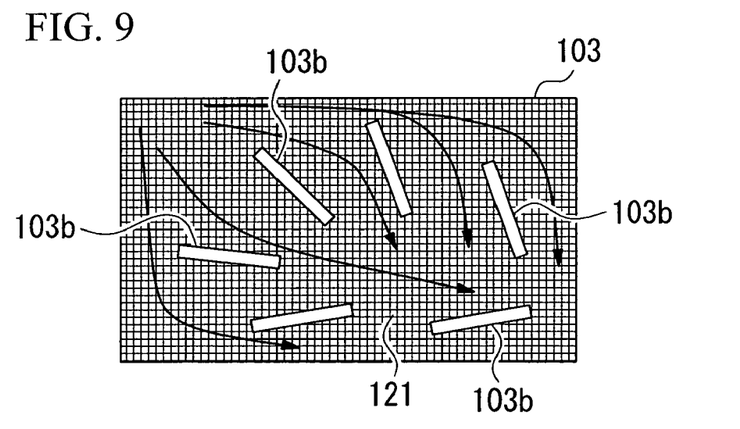
FIG. 9 is a plan view showing a pattern of reaction gas flow passages formed in a separator assembly with a diffusion layer according to a seventh embodiment of the present invention.
Figure 10:
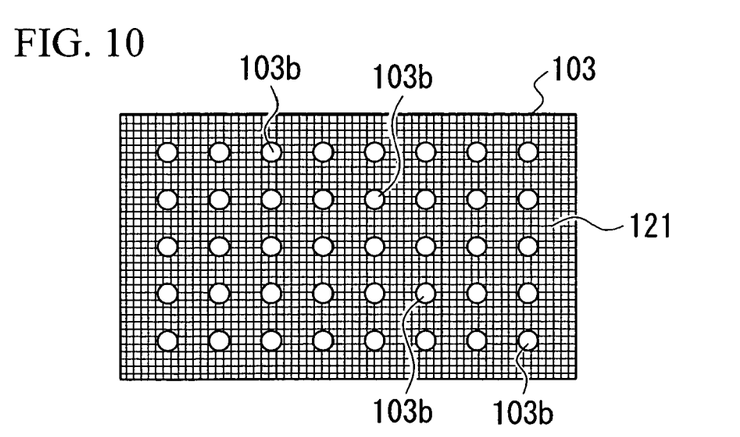
FIG. 10 is a plan view showing a pattern of reaction gas flow passages formed in a separator assembly with a diffusion layer according to a eighth embodiment of the present invention.

Whether the flow passage partitions 103b should be formed in a shape having a number of spots, or in a straight shape is determined depending on the desired configuration of the flow passages. For example, as shown in FIG. 8, a number of straight-shaped flow passage partitions 103b, which are parallel to each other, may be made so as to form a fuel flow passage 121 having a zigzag shape (a sixth embodiment). Moreover, as shown in FIG. 9, straight-shaped flow passage partitions 103b may be disposed at random so as to form a fuel flow passage 121 between the flow passage partitions 103b (a seventh embodiment). Furthermore, as shown in FIG. 10, a number of spot-shaped flow passage partitions 103b may be made so as to form a fuel flow passage 121 between the flow passage partitions 103b (a eighth embodiment). When the straight-shaped flow passage partitions 103b are made, the welded portions in the anode side diffusion layer 103 and the anode side separator 105 are also made in a straight shape; therefore, the contact area between the anode side diffusion layer 103 and the anode side separator 105 can be increased. In all cases explained above, the reaction gas flow passages can be configured more freely than in the conventional art.

As explained above, welding of the anode side diffusion layer 103 with the anode side separator 105, and forming of the flow passage partitions 103b in the diffusion layer 103 can be performed simultaneously, and thus the fuel flow passage 121 is formed in the anode side diffusion layer 103.

Welding of the cathode side diffusion layer 104 with the cathode side separator 106, and forming of the flow passage partitions 104b in the cathode side diffusion layer 104 are performed in a similar manner so as to form the oxidizer flow passage 122 in the cathode side diffusion layer 104.

A CT layer (not shown) for improving gas diffusion performance and conductivity and a CNV layer (not shown) as an adhesive are coated on the surface of the anode side diffusion layer 103 in the anode side separator assembly 107 fabricated by the above processes and on the surface of the cathode side diffusion layer 104 in the cathode side separator assembly 107 fabricated by the above processes. After the coating process, the membrane electrode assembly 102 is sandwiched by the anode side separator assembly 107 and the cathode side separator assembly 107, and is unified therewith using a hot press process so as to yield the fuel cell unit 101.

Because the diffusion layer 103 and the separator 105 are welded together by laser-welding to form the anode side separator assembly 107, and the diffusion layer 104 and the separator 106 are welded together by laser-welding to form the cathode side separator assembly 107, it is easy to handle the separator assemblies 107 and 107, and it becomes easier to assemble the fuel cell unit 101 or to assemble the fuel cell stack S1.

Moreover, because the fuel flow passage 121 and the oxidizer flow passage 122 are respectively defined in the diffusion layers 103 and 104 using the flow passage partitions 103b and 104b formed in the diffusion layers 103 and 104, the separators 105 and 106 may be made flat without concave and convex portions. Accordingly, the thickness of the separator assembly 107 in the stacking direction can be reduced, and the separator assembly 107 can be made compact and light. As a result, the fuel cell unit 101 and the fuel cell stack S1 can be made thinner; therefore, the fuel cell unit 101 and the fuel cell stack S1 can also be made compact and light. In addition, the fuel flow passage 121 and the oxidizer flow passage 122 can be configured more freely than in the conventional art.

Furthermore, in contrast to fabricating conventional separators, a press-forming process is not required; therefore, the separators 105 and 106 can be made thinner, and manufacturing cost can be reduced because molds for press-forming are not required.

Moreover, because the separators 105 and 106, each having a flat shape, contact the diffusion layers 103 and 104 over the entire surfaces thereof, and the welded portions between the diffusion layers 103 and 104 and the separators 105 and 106 exhibit a very high conductivity, the electrical resistance between the diffusion layers 103 and 104 and the separators 105 and 106 can be made very low. As a result, performance of the fuel cell unit 101 and performance of the fuel cell stack S1 can be improved.

Furthermore, because electrical resistance can be reduced without applying abutting pressure, the separator assemblies 107 do not have to be very rigid; therefore, the separator assemblies 107 can be made compact and light. As a result, the fuel cell unit 101 and the fuel cell stack S1 do not have to be very rigid; therefore, the fuel cell unit 101 and the fuel cell stack S1 can also be made compact and light.

In addition, because the diffusion layers 103 and 104 and the separators 105 and 106 have surface contacts with each other, increase in contact pressure at the contact areas between the diffusion layers 103 and 104 and the separators 105 and 106 can be limited even when a load in the stacking direction is applied to the separator assemblies 107; therefore, the separator assemblies 107 can sufficiently resist damage. Accordingly, the fuel cell unit 101 and the fuel cell stack S1 can also sufficiently resist damage.

According to a method for fabricating the separator assemblies 107 of the fourth embodiment, because welding of the diffusion layers 103 and 104 with the separators 105 and 106, and forming of the flow passage partitions 103b and 104b in the diffusion layers 103 and 104 can be performed simultaneously, the time it takes to manufacture the separator assemblies can be reduced, and thus productivity in manufacturing the separator assemblies can be improved. Moreover, because the laser welding process is employed, the time it takes to manufacture the separator assemblies 107 can be reduced, and the separator assemblies 107 can be continuously manufactured. Due to ease of handling the separator assemblies 107 as well, productivity in manufacturing the fuel cell units 101 and the fuel cell stacks S1 can be improved.

Figure 11:
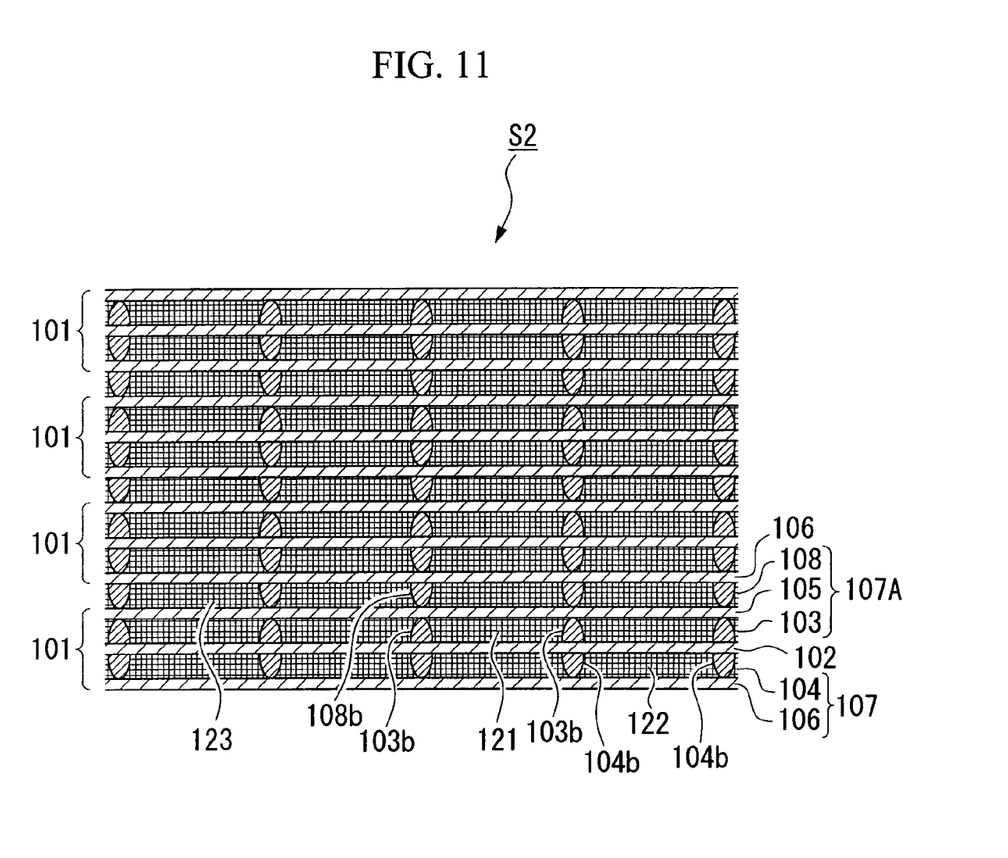
FIG. 11 is a cross-sectional view showing a fuel cell stack having separator assemblies with diffusion layers according to a ninth embodiment of the present invention.

FIG. 11 is a longitudinal cross-sectional view of a fuel cell stack S2 according to a ninth embodiment of the present invention.

The fuel cell stack S2 of the ninth embodiment differs from the fuel cell stack S1 of the fourth embodiment shown in FIG. 5 in the following points.

In the fuel cell stack S2, between the fuel cell units 101 and 101 adjacent to each other, while the coolant flow passages (110 in FIG. 5) are formed in the case of the fourth embodiment, there is provided a cooling layer 108 made of a porous metal body such as one made of stainless steel, HASTELLOY®, INCONEL®, Au, Cu, Ni, Al, or Ti. In other words, not only has the anode side diffusion layer 103 been laser-welded with the anode side separator 105, but also the cooling layer 108 has been laser-welded with the anode side separator 105, i.e., the anode side diffusion layer 103, the anode side separator 105, and the cooling layer 108 are welded together to form the separator assembly 107A. In the cooling layer 108, there are formed coolant flow passages 123, which are defined by flow passage partitions 108b, for allowing coolant to flow through.

The process for welding the cooling layer 108 with the anode side separator 105 is similar to that for welding the anode side diffusion layer 103 with the anode side separator 105, and the process for forming the flow passage partitions 108b is similar to that for forming the flow passage partitions 103b. More specifically, a laser beam is emitted in the direction from the cooling layer 108 to the anode side separator 105 so as to locally melt the cooling layer 108, and then the cooling layer 108 is cooled down. As a result, the cooling layer 108 is connected to the anode side separator 105 by the solidified metal at the bottom of the cooling layer 108, and thus the cooling layer 108 and the anode side separator 105 are welded together. At the same time, the pores disposed around the groove 103a are closed, and the flow passage partitions 108b are formed.

As explained above, welding of the cooling layer 108 with the anode side separator 105, and forming of the flow passage partitions 108b in the cooling layer 108 can be performed simultaneously, and thus the coolant flow passage 123 is formed in the cooling layer 108.

Because the diffusion layer 103, the anode side separator 105, and the cooling layer 108 are welded together to form the anode side separator assembly 107A, it is easy to handle the separator assemblies 107A and 107A, and it becomes easier to assemble the fuel cell units 101 or to assemble the fuel cell stack S2.

In addition, because the coolant flow passage 123 is defined by the flow passage partitions 108b formed in the cooling layer 108, the coolant flow passage 123 can be configured more freely than in the conventional art.

Furthermore, because the separators 105 and 106 and the cooling layer 108 have surface contacts with each other, increase in contact pressure at the contact areas between the cooling layer 108 and the separator 105 and 106 can be limited even when a load in the stacking direction is applied to the separator assemblies 107A; therefore, the separator assemblies 107A can sufficiently resist damage. Accordingly, the fuel cell unit 101 and the fuel cell stack S2 can also sufficiently resist damage.

According to a method for fabricating the separator assemblies 107A of the ninth embodiment, because welding of the cooling layer 108 with the separator 105, and forming of the flow passage partitions 108b in the cooling layer 108 can be performed simultaneously, the time it takes to manufacture the separator assemblies can be reduced, and thus productivity in manufacturing the separator assemblies can be improved. Moreover, because the laser welding process is employed, the time it takes to manufacture the separator assemblies 107A can be reduced, and the separator assemblies 107A can be continuously manufactured. Due to ease of handling the separator assemblies 107A as well, productivity in manufacturing the fuel cell units 101 and the fuel cell stacks S2 can be improved.

Alternatively, the cooling layer 108 may be welded not with the anode side separator 105, but with the cathode side separator 106, and thus the cathode side diffusion layer 104, the cathode side separator 106, and the cooling layer 108 may be welded together to form the separator assembly.

A YAG laser is preferable for fabricating the separator assemblies 107 and 107A of the present invention, specifically in view of precision welding. Other types of laser that can be used for fabricating the separator assemblies 107 and 107A may be gas lasers such as a He—Ne laser, an $Ar^+$ laser, or $CO_2$ laser, solid state lasers such as a ruby laser or a glass laser, liquid lasers such as an organic laser or a dye laser, and semiconductor lasers such as a GaAs laser.

Instead of the laser welding process, an electron beam welding process or a TIG welding process can also be employed.

ADVANTAGEOUS EFFECTS OBTAINABLE BY THE INVENTION

As explained above, according to the separator assembly with a diffusion layer of the present invention, because the diffusion layer and the separator are welded together, it is easy to handle the separator assembly.

Moreover, because the diffusion layer and the separator are welded together by laser welding, the conductivity at connecting portions can be made very high; therefore, the electrical resistance between the diffusion layer and the separator can be made very low.

Furthermore, because the electrical resistance between the diffusion layer and the separator can be made very low without applying high abutting pressure, the diffusion layer and the separator do not have to be made very rigid, and as a result, the separator assembly can be made compact and light.

According to another separator assembly with a diffusion layer of the present invention, because a fuel flow passage or an oxidizer flow passage is formed in the diffusion layer using the flow passage partitions, concave and convex portions for forming the fuel flow passage or oxidizer flow passage do not have to be provided in the separator, i.e., the separator may be made flat. Accordingly, the thickness of the separator assembly in the stacking direction can be reduced, and the separator assembly can be made compact and light. In addition, the reaction gas flow passage can be configured more freely than in the conventional art. Furthermore, in contrast to fabricating conventional separators, a press-forming process is not required; therefore, the separator can be made thinner, and manufacturing cost can be reduced because molds for press-forming are not required.

In addition, because the diffusion layer and the separator have surface contact with each other over the entire surfaces thereof, and the welded portions between the diffusion layer and the separator exhibit a very high conductivity, the electrical resistance between the diffusion layer and the separator can be made very low.

Moreover, because the diffusion layer and the separator have surface contact with each other over the entire surfaces thereof, increase in contact pressure at the contact areas between the diffusion layer and the separator can be limited even when a load in the stacking direction is applied to the separator assembly; therefore, the separator assembly can sufficiently resist damage.

According to another separator assembly with a diffusion layer of the present invention, because the diffusion layer, the separator, and the cooling layer are welded together, it is easy to handle the separator assembly. Moreover, the flow passages for the coolant can be configured more freely than in the conventional art.

In addition, because the cooling layer and the separator have surface contact with each other over the entire surfaces thereof, increase in contact pressure at the contact areas between the cooling layer and the separator can be limited even when a load in the stacking direction is applied to the separator assembly; therefore, the separator assembly can sufficiently resist damage.

According to the method for fabricating the separator assembly with a diffusion layer of the present invention, because the diffusion layer and the separator are welded together by laser-welding without exerting adverse effects on gas diffusion performance in the diffusion layer, the separator assembly with a diffusion layer having excellent gas diffusion performance can be easily manufactured.

Moreover, because the laser welding process is employed, the time it takes to manufacture the separator assembly can be reduced, and the separator assemblies can be continuously manufactured, and thus productivity in manufacturing the separator assemblies can be improved.

According to another method for fabricating the separator assembly with a diffusion layer of the present invention, because welding between the diffusion layer and the separator, and forming the flow passage partitions in the diffusion layer can be performed simultaneously, the time it takes to manufacture the separator assembly can be reduced, and productivity in manufacturing the separator assemblies can be improved.

Moreover, because the laser welding process is employed, the time it takes to manufacture the separator assembly can be reduced, and the separator assemblies can be continuously manufactured, and thus productivity in manufacturing the separator assemblies can be improved.

According to another method for fabricating the separator assembly with a diffusion layer of the present invention, because welding between the cooling layer and the separator, and forming the flow passage partitions in the cooling layer can be performed simultaneously, the time it takes to manufacture the separator assembly can be reduced, and productivity in manufacturing the separator assemblies can be improved.

Moreover, because the laser welding process is used, the time it takes to manufacture the separator assembly can be reduced, and the separator assemblies can be continuously manufactured, and thus productivity in manufacturing the separator assemblies can be improved.

According to the fuel cell unit of the present invention, because the diffusion layer and the separator are welded together by laser welding, the conductivity at connecting portions can be made very high; therefore, the electrical resistance between the diffusion layer and the separator can be made very low. As a result, performance of the fuel cell unit can be improved. Furthermore, because the electrical resistance between the diffusion layer and the separator can be made very low without applying high abutting pressure, the fuel cell unit does not have to be made very rigid; therefore, the fuel cell unit can be made compact and light. Moreover, because the laser welding process is used, the time it takes to manufacture the fuel cell unit can be reduced, and productivity in manufacturing the fuel cell units can be improved.

According to another fuel cell unit of the present invention, because a fuel flow passage or an oxidizer flow passage is formed in the diffusion layer using the flow passage partitions, concave and convex portions for forming the fuel flow passage or oxidizer flow passage do not have to be provided in the separator, i.e., the separator may be made flat. Accordingly, the thickness of the separator assembly with a diffusion layer in the stacking direction can be reduced, and the fuel cell unit can be made compact and light.

In addition, because the diffusion layer and the separator have surface contact with each other over the entire surfaces thereof, and the welded portions between the diffusion layer and the separator exhibit a very high conductivity, the electrical resistance between the diffusion layer and the separator can be made very low, and the electrical resistance in the fuel cell unit can also be made very low.

Furthermore, because the electrical resistance between the diffusion layer and the separator can be made very low without applying high abutting pressure, the fuel cell unit does not have to be made very rigid, and the fuel cell unit can be made compact and light.

In addition, because the diffusion layer and the separator have surface contact with each other over the entire surfaces thereof, increase in contact pressure at the contact areas between the diffusion layer and the separator can be limited even when a load in the stacking direction is applied to the fuel cell unit, and damage to the fuel cell unit can be prevented.

Moreover, because the laser welding process is used, the time it takes to manufacture the fuel cell unit can be reduced, and the fuel cell units can be continuously manufactured, and thus productivity in manufacturing the fuel cell units can be improved.

According to another fuel cell unit of the present invention, because the flow passage for the coolant is defined by the flow passage partitions formed in each of the cooling layers, the structure of the fuel cell stack can be simplified. Moreover, because the cooling layer and the separator have surface contact with each other over the entire surfaces thereof, increase in contact pressure at the contact areas between the cooling layer and the separator can be limited even when a load in the stacking direction is applied to the fuel cell unit, and damage to the fuel cell unit can be prevented.

Moreover, because the laser welding process is employed, the time it takes to manufacture the fuel cell unit can be reduced, and the fuel cell units can be continuously manufactured.

According to the fuel cell stack of present invention, the performance of the fuel cell stack can be improved, and the fuel cell stack can be made compact and light.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A separator assembly for a fuel cell stack, comprising:
   a diffusion layer including a porous metal body for diffusing and supplying one of fuel and oxidizer to an electrode of the fuel cell stack, and a plurality of longitudinally extending flow passage partitions formed within the porous metal body to define a flow passage for the fuel or oxidizer; and
   a separator including a metal plate which is disposed adjacent to the diffusion layer, an entire area of the separator being substantially flat,
   wherein the diffusion layer and the separator are welded together by laser welding, wherein the plurality of flow passage partitions of the metal body forming the diffusion layer, which are formed by melting the metal body by irradiation by a laser beam and by solidifying the metal body, are formed in the diffusion layer so as to define the flow passage for the fuel or oxidizer in the diffusion layer.

2. A separator assembly according to claim 1, wherein the diffusion layer and the separator are welded together by electron beam welding.

3. A separator assembly according to claim 1, wherein the diffusion layer and the separator are welded together by TIG welding.

4. A separator assembly according to claim 1, further comprising a cooling layer including a porous metal body for allowing coolant to flow through, which is disposed adjacent to the separator and opposite the diffusion layer with respect to the separator,
 wherein the cooling layer and the separator are welded together by laser welding, and
 wherein flow passage partitions of the metal body forming the cooling layer, which are formed by melting the metal body by irradiation by a laser beam and by solidifying the metal body, are formed in the cooling layer so as to define a flow passage for the coolant in the cooling layer.

5. A separator assembly according to claim 1, wherein the separator is provided for separating the fuel and the oxidizer from each other.

6. A separator assembly according to claim 1, wherein a height of the flow passage partition formed in the diffusion layer is substantially the same as a thickness of the metal body.

* * * * *